United States Patent Office 3,133,034
Patented May 12, 1964

3,133,034
RESORCINOL-FORMALDEHYDE RESINS AND
ADHESIVES MADE THEREFROM
William E. St. Clair, Pittsburgh, and Roy H. Moult, Butler, Pa., assignors to Koppers Company, Inc., a corporation of Delaware
No Drawing. Filed Dec. 16, 1960, Ser. No. 76,123
8 Claims. (Cl. 260—29.3)

This invention relates to a novel method of making resorcinol-formaldehyde resin solutions and to superior adhesives prepared therefrom. In one specific aspect, it relates to high-strength, waterproof adhesives, capable of being cured at relatively low temperatures, prepared from a solution of a fusible resorcinol-formaldehyde resin made by controllably reacting resorcinol and formaldehyde.

Resorcinol-formaldehyde adhesives are well-known for their exceptional strength and water resistance. While it has been often suggested that these adhesives are well suited for the bonding of wood, particularly plywood, the expense involved in making the conventional or commercial grade resorcinol-formaldehyde adhesives has drastically limited their use in this field.

Conventionally, the preparation of a resorcinol-formaldehyde adhesive involves forming a solution of a water soluble, fusible resorcinol-formaldehyde resin, and making an adhesive mix therefrom by adding to the resin solution a methylene donor to cure the resin to a cross-linked, insoluble, infusible state. Common methylene donors or "hardners" are aqueous formalin, para-formaldehyde, hexamethylenetetramine and the like. In addition to the hardner, the adhesive mix generally contains fillers, i.e. inert materials added to increase the weight of the mix, and extenders, i.e. inert materials which lessen the cost without reducing the valuable properties of the adhesive. Common extenders include walnut shell flour, wood flour, bark flour, asbestos, and cellulosic fibers. The curing time of a particular adhesive mix is often adjusted with a catalyst or modifier.

One important factor in the cost of resorcinol-formaldehyde adhesives is the solids content of the resin solution or the percentage of soluble, fusible resorcinol-formaldehyde resin present in solution prior to the formulation of the adhesive mix. The solids content of the resin solution required for making acceptable adhesives is influenced considerably by the technique used to prepare the fusible resin. The required solids content using a particular resin solution is that necessary to provide an operable gluing viscosity, established by commercial practice as a viscosity of about 300–400 cps. at 73° F., and sufficient reactive phenolic body to provide for waterproof gluing. The known resorcinol-formaldehyde adhesive mixes are acceptable from the standpoint of activity and gluing viscosity only if the resin solids content of the solution from which the adhesive mix is prepared ranges from about 40–65% by weight.

From the standpoint of cost, resorcinol is the most expensive ingredient used in preparing the adhesives. It is obvious that if the required resin solids content of the resin solution could be reduced with acceptable results, the over-all cost of the adhesive could be likewise reduced. Unfortunately, the minimum acceptable solids content, using solutions of fusible resorcinol-formaldehyde resins prepared by heretofore known methods, is drastically limited by a variety of factors. Many of the known methods of making resorcinol-formaldehyde solutions provide a product which contains 50–65% resin solids and which is incapable of further dilution without gelation during the preparation step. Such solutions must be used at concentrations above that at which there is considerable tendency to gel, since any measurable amount of gelation in resin solution prior to, or during the formulation of the adhesive mix results in an adhesive mix of substantially no pot life, which is obviously commercially unacceptable. There have been prior attempts to prepare resin solutions which are stable in concentrations as low as 30% by weight solids but, unfortunately, such solutions do not have the necessary gluing viscosity or they lack the necessary amount of active phenolic body required to provide a waterproof gluing of high strength. While the gluing viscosity can be obviously adjusted by adding an extender, there is no practical compensation for the lack of active phenolic body in the resin solution other than that of adding more resorcinol, thereby defeating the purpose of reducing the solids content.

As we have noted, the gluing viscosity and the operable limit of resin solids content are influenced considerably by the technique used to prepare the resin. Theoretically, a resorcinol-formaldehyde resin will become infusible when the mole ratio of formaldehyde in a resin is equal to or greater than that of the resorcinol. Thus, the stability of a particular resin solution is measurably influenced by the formaldehyde content of the resin and the tendency toward gelation is greater as the formaldehyde content of the resin is increased. While it has been reported that fusible resorcinol-formaldehyde resins having a mole ratio of resorcinol to formaldehyde as high as 1:0.95 can be made, the carefully tailored techniques required to produce such resins are often expensive, and for the most part, they result in products having a relatively low proportion of active phenolic body which, when used in an adhesive formulation, provide adhesives which are not sufficiently waterproof. Moreover, the extreme tendency toward gelation of such resin formulations make them undesirable with respect to the storability of the resin solution and the pot life and the working life of the glue mixes. In spite of the teachings of the art, it has been found in industrial practice that a practical limitation on the mole ratio of resorcinol to formaldehyde is approximately 1 mole of resorcinol for each 0.7 mole of formaldehyde. For this reason, the resins used to prepare most commercial adhesives have a mole ratio ranging between 1 mole of resorcinol to 0.57–0.62 mole of formaldehyde. Little or no difficulty is incurred in preparing solutions of such resins, although the resorcinol-formaldehyde ratio tends to be a limiting factor on the minimum solids content of the resin solution and the attainable gluing viscosity of adhesive mixes prepared therefrom.

Resorcinol-formaldehyde resin solutions are made commercially in a variety of ways and, as explained hereabove, the properties of the resulting solution vary considerably with the method of preparation.

One common technique involves reacting resorcinol with formaldehyde under alkaline conditions at reflux temperature. Formaldehyde is usually added portionwise to give a solution of predetermined viscosity. Under reflux conditions, alkaline catalyzed resorcinol-formaldehyde condensation products react rapidly and sometimes violently, as is indicated by the increasing viscosity of the solutions as the formaldehyde content is increased. This type of resin solution gels easily, even using less than 0.7 mole formaldehyde for each mole of resorcinol. If substantially less formaldehyde is used in the resin preparation in order to control the viscosity and the solution is diluted back to a viscosity usable in adhesives for bonding wood, the solids content is usually so low that the resulting adhesive fails to produce a waterproof bond. If, by careful control of the reaction, the formaldehyde content is increased to about 0.67 mole of formaldehyde per mole of resorcinol, a resin solution is obtained which can be safely diluted back to about 55–65% solids and used to prepare an adhesive for waterproof gluing.

Resorcinol can be reacted with formaldehyde in the absence of a catalyst, but the resulting products are unstable and precipitate during the reaction, or they become unstable on storage. If during the preparation, the temperature is reduced below reflux and the solids concentration below 65%, this tendency to precipitate is increased. For example, at 5–10% concentration in water as much as 30% of the product is cross-linked and precipitated as an insoluble, infusible resin even at room temperature. It is possible to use an uncatalyzed reaction and then shift the pH to the alkaline side to maintain solubility and stability of the resin solution. The insoluble material formed during the uncatalyzed reaction is converted to a soluble salt which, unfortunately, is relatively inert and is no longer active as an adhesive. Resin solutions prepared in this manner which contain less than about 50% solids content fail to give satisfactory glues, since there is insufficient active phenolic body present to form waterproof bonds.

A well-known method for making resorcinol-formaldehyde adhesives is described in Norton, U.S. Patent 2,385,370. According to Norton, resorcinol is diluted with water and then admixed with an acid catalyst, such as oxalic acid. The mixture is heated under reflux conditions and formaldehyde is added thereto dropwise or in small increments in such a manner that the formaldehyde is substantially instantly reacted with the resorcinol. Sufficient formaldehyde can be added to provide a fusible resin having a mole ratio of resorcinol to formaldehyde of 1:0.8. The resulting product is then dehydrated or "brittled off" and reconstituted in a solvent. Although the dehydration step is somewhat expensive, the resins produced by this method are excellent, if they are limited to a resorcinol to formaldehyde ratio of 1 mole of resorcinol to 0.6–0.65 mole of formaldehyde. When reconstituted, the resins provide a resin solution having a gluing viscosity of 300–400 cps. at 73° F. at a solids content 45–65%. If the solids content is reduced to less than 40%, the gluing viscosity is very low and the resulting glues are not commercially desirable.

Another excellent method of preparing a resorcinol-formaldehyde adhesive is described in Rhodes, U.S. 2,385,374. The Rhodes method involves mixing resorcinol with an initial portion of formaldehyde, heating the mixture to reflux to produce homogeneity and thereafter adding the remainder of the formaldehyde as rapidly as possible without exceeding the capacity of the reflux. As soon as the formaldehyde has been completely added, a suitable amount of oxalic acid is added to catalytically drive the reaction to completion. The resulting mixture is diluted with water and stirred to homogeneity to provide a resin solution having a pH varying between about 1.5 and 3. The mole ratio of resorcinol to formaldehyde in the resin varies between about 1 mole of resorcinol to 0.6–0.95 mole of formaldehyde. The pH of the resin solution is adjusted with alkali to within a range of 7–9, thereby providing a solution which is substantially entirely stabilized at a resin solids content as low as 30% by weight. The method of Rhodes has enjoyed considerable commercial success when used to make resins having less than 0.7 mole of formaldehyde for each mole of resorcinol. Regrettably, if the formaldehyde content is increased up to 0.80–0.9 mole of formaldehyde per mole of resorcinol, the resin solution is no longer completely stable at a resin solids content as low as 30% and an adhesive prepared from such a resin solution is not waterproof, as is shown in comparative Example IV.

Quite surprisingly, we have found a novel technique of controlling the reaction between resorcinol and formaldehyde to give a clear stable solution of a resin containing 0.8–0.95 mole of formaldehyde for each mole of resorcinol. The resin solutions prepared by our new method are infinitely dilutable and can be used to formulate wood adhesives having satisfactory viscosity and capable of providing waterproof bonds at a resin solids content as low as 15%. Our resin solutions are easily made and are stable indefinitely on storage. Adhesives made therefrom have excellent pot life and can be cured more rapidly at relatively low temperatures, i.e. 40–212° F., than commercially available resorcinol-formaldehyde adhesives.

It is therefore an object of the present invention to provide a novel, storage stable resorcinol-formaldehyde resin solution capable of infinite dilutability. It is a further object to provide adhesives made from such solutions, which are characterized by acceptable gluing viscosities and are capable of providing high strength, waterproof bonds with wood having a wide range of moisture content, particularly plywood, at a resin solids content as low as 15% by weight.

In accordance with the present invention, a clear, storage stable resorcinol-formaldehyde resin solution, capable of infinite dilutability, is prepared by (1) catalytically reacting under reflux conditions resorcinol and formaldehyde at a mole ratio of approximately 1:0.2–0.3 in the presence of sufficient oxalic acid dihydrate to lower the pH to less than 1, (2) adding additional formaldehyde to bring the resorcinol to formaldehyde ratio to approximately 1:0.5–0.7, (3) heating the resulting mass to reflux, (4) adding thereto sufficient water of dilution to control the exothermic reaction occasioned by the formaldehyde addition, (5) adding additional formaldehyde to bring the mole ratio of resorcinol to formaldehyde to 1:0.8–0.95 and the pH of the reaction mixture to 1.3–1.7, (6) heating the mass under reflux for a short period of time and (7) adding thereto sufficient concentrated aqueous caustic to bring the pH within the range of 6.5–7.0.

The foregoing series of steps must be carefully adhered to to provide the resin solutions of the invention and any variance therefrom will have a deleterious effect on the product. The technique is particularly critical with respect to the formaldehyde addition and the point at which water of dilution is added.

The acid catalyst, oxalic acid dihydrate, must be added either during or just subsequent to the first formaldehyde addition. Conveniently, resorcinol is admixed with sufficient formaldehyde (as a 37% aqueous solution) to provide a mole ratio of resorcinol to formaldehyde of approximately 1:0.2–0.3. The mass is then heated, under agitation, to the reflux temperature and then oxalic acid dihydrate is added in an amount sufficient to reduce the pH to less than 1, preferably less than 0. We have found that by adding the above-indicated amount of oxalic acid at this step in the process, we are able to obtain the greatest possible reaction speed at a time when the solids content of the mixture is at its highest point. As more formaldehyde is added to the reaction mixture as a 37% solution, the solids content of the mixture is obviously decreased. Astonishingly, we have discovered that by achieving maximum possible reaction speed at the point of maximum solids content, it is possible to produce condensates, characterized by long chain lengths and high molecular weight, which are indefinitely stable. If our critical procedure is not followed, the resulting resorcinol-formaldehyde condensate reacts slowly to give a highly branched polymer, which is considerably less stable and which reacts slowly at room temperature, thereby decreasing the reactivity of adhesives prepared from the resin solution. The maximum rate of reaction is achieved only by lowering the pH to less than one at this step in the process.

We have also found it essential to add the formaldehyde in three increments, rather than two as taught by Rhodes. After the initial condensate, having a mole ratio of resorcinol to formaldehyde of approximately 1:0.2–0.3 is prepared, a second increment of formaldehyde is added to bring the mole ratio to approximately 1:05–0.7. The resulting mass is heated to reflux, and it is absolutely necessary to then add sufficient water of dilution to control the exothermic reaction occasioned by formaldehyde addition. This is accomplished by adding water generally in an amount of 0.5–2 parts by weight water for each part resorcinol. The presence of dilution water permits the greatest degree of formaldehyde dispersion when the third increment of formaldehyde is added to bring the mole ratio of resorcinol to formaldehyde to 1:0.8–0.95. It is extremely critical to add the third increment of formaldehyde in the shortest possible period of time. After all of the formaldehyde is added, the reaction mixture is refluxed in order to remove all residual methylol groups and to insure the highest degree of polymerization obtainable at the prescribed resorcinol to formaldehyde mole ratio.

After the final refluxing step, there is added sufficient concentrated aqueous alkali, conveniently as a 40–60% by weight solution, to bring the pH within the range of 6.5–7.0. At a pH below 6.5, the resin solution is not completely stable, and at a higher pH, the reactivity of the resin is increased to a point at which the pot life of adhesives prepared therefrom is too short to be of practical use.

The resin solution thus prepared has an extremely high viscosity; in fact, it is so viscous that the measurement of the viscosity is difficult to obtain with ordinary viscosimiters. When the solution is diluted, with water or any water-miscible solvent, to a normal gluing viscosity of 300–400 cps. at 73° F., it has a solids content ranging between 15–35%, preferably between 20–35%. The resin solutions are storage stable for long periods of time under extreme conditions without adversely affecting their properties.

The resin solutions of the invention are converted to general purpose laminating adhesives by diluting the solution to the desired gluing viscosity and adding thereto sufficient methylene donor or hardener to convert the water soluble, fusible resin to an insoluble, infusible state. Suitable hardeners include aqueous formalin, paraformaldehyde, trioxane, hexamethylenetetramine and methylol dimethylhydantoin. The amount of hardener added is that sufficient to bring the combined molar amount of formaldehyde plus methylene donor to an amount greater than the molar amount of resorcinol. The final adhesive mix is adjusted as desired with conventional modifiers, such as caustic, extenders, such as walnut shell flour, wood flour and the like, fillers and water or water miscible solvents to provide a mix having a gluing viscosity of 300–2500 cps. at 73° F.

The great versatility of our novel resin solutions is demonstrated by the variety of different adhesives that can be made therefrom. For example, the resin solution can be used at a relatively high solids content of 50–60% and admixed with a liquid hardener such as paraform to make a high solids adhesive. Alternatively, the resin solution can be diluted with water or any water miscible solvent to a solids content as low as 15% by weight. The pH of the resin solution can be adjusted with various modifiers to give different speeds of cure. The resin solution can be used interchangeably with liquid or solid hardener. It can be overdiluted, viz: diluted to a point below a normal gluing viscosity and then thickened by the use of extenders and fillers. The resin solution can be modified to make a fast curing adhesive at elevated temperatures, or it can be modified with an amino body such as urea, thiourea or melamine to give an adhesive having a long pot life and practically no odor during mix or use. The resin solution is particularly advantageous in the formulation of adhesive mixes having a low resin solids content because of the obvious saving in raw material cost.

The adhesives of the invention containing a paraformaldehyde hardener can be cured to the insoluble, infusible state in one hour. Those made with aqueous formalin solutions require only a 30 minute cure at ambient temperatures. This is quite surprising, since the best resorcinol-formaldehyde adhesives of the prior art required at least 90 minutes curing time at 73° F. in order to obtain a satisfactory cure.

Previously known fast curing resorcinol-formaldehyde resin solutions must be cooled when admixed with formaldehyde donors to offset the exothermicity of the mix. Surprisingly, the adhesive mixes of the invention are practically nonexothermic and useful throughout their whole pot life, even when uncooled and when no particular precautions are taken to control the temperature of the mix.

The adhesives of the invention offer particular advantage in that they will glue end-grain and edge-grain lumber to strengths approaching those of the wood, gluings which are much more difficult than the bonding of regular laminates. For regular laminates, the wood is laid up with grains parallel. In plywood, the thin veneers are cross bands, but are still flat glued. Lumber which is cut on an angle sloping away from the axis of the board is referred to generally as a scarf cut. When the boards are notched, they are referred to as finger joints. Scarf cuts and finger joints are extremely difficult to bond because the cut ruptures the fiber ducts and the end grain, which is extremely porous, is exposed and tends to draw out the adhesive by capillary action. The high molecular weight of our novel resins causes the adhesive made therefrom to remain in the end-glued joint and thus bond to a waterproof state.

With previously known laminating adhesives, an open assembly time of 0–5 minutes and a closed assembly time of up to 60 minutes are used before clamping. A clamp time of no less than 4 hours, generally 12–16 hours, is used, followed by a long curing period to give high-strength, waterproof joints. In contrast therewith, our novel adhesive requires 0 minutes open and 15 minutes closed assembly with a minimum clamp time of 15 minutes.

In plywood manufacture, conventional adhesives used to prepare exterior grade waterproof products are pressed for 7.5–7.0 minutes at 280–300° F. in order to achieve a waterproof bond of high strength. With our adhesives, pressing can be accomplished in as little as 20 seconds at 175° F., 90 seconds at 150° F., 15 minutes at about 100° F. and 30 minutes at 75° F.

Our invention is further illustrated by the following examples: The word "parts" as used in the examples refers to parts by weight.

EXAMPLE I

Resorcinol, 264 parts, and 48 parts of a 37% aqueous formaldehyde solution were charged to a 100 gallon kettle to provide a mixture having a resorcinol to formaldehyde ratio of 1 mole of resorcinol to 0.246 mole of formaldehyde. Heat was applied and agitation begun. The reaction mixture was heated for 15 minutes at reflux (100° C.) and then 1.6 parts of oxalic acid dihydrate was added thereto. At this point, the measured pH (as taken with a Beckman pH meter) was 0. One hour later, 74.4 parts of the formaldehyde solution was slowly added over a period of 30 minutes with cooling being applied to the kettle jacket to give a reaction mixture, containing one mole of resorcinol and 0.628 mole of formaldehyde and having a pH of 0.4–0.6. Heat was then applied and 200 parts of water was slowly added to the mixture over a 15 minute period to give a solution having a solids content about 53.5%. The resulting solution was heated to reflux and 41.6 parts of formaldehyde solution was added thereto with cooling to bring the mole ratio of resorcinol to formaldehyde to one mole of resorcinol to 0.84 mole of formaldehyde. At this point, the solids content was 52% and the pH ranged between 1.3 and 1.7. The third formaldehyde addition required about 10 minutes and the reaction mixture was thereafter heated to reflux.

After 20 minutes at reflux, the viscosity had reached 60 million cps. at 73° F. The solution was cooled and the pH thereof was adjusted to 6.5–7.0 with 12 parts of 50% caustic solution.

148 parts of water was added to the solution thus prepared to give a clear resin solution having a viscosity, as measured by Gardner-Holdt viscosimeter of 36,200–46,300 cps. at 73° F. This solution was completely stable and the viscosity did not increase even with additional heating. The solids content at this point measured 36.7% by weight (calculated 36.5% by weight). The solution was found to be infinitely dilutable and also capable of being dehydrated to a brittle solid without difficulty to give a solid resin having a ring and ball softening point of 116° C. (ASTM—E 28–51 T). No previously known dehydrated resorcinol-formaldehyde resin has a softening point in excess of 110° C.

It required 25 additional parts of water to reduce the solids content to 35% and the viscosity to about 2000 cps. at 73° F. An additional 55–60 parts of water was required to reduce the viscosity to 320–340 cps. and to give a clear stable resin solution having a solids content of about 30–32%.

EXAMPLE II 100 parts of the resin solution of Example I having a solids content of about 30% was mixed with 8 parts paraformaldehyde to give an adhesive having a pot life of 50–60 minutes at 73° F. It was found that, if the pot life was left uncontrolled, a slight exotherm of about 5° C. occurred and the pot life was reduced to 40–45 minutes.

An additional 100 parts of the resin solution was mixed with 12 parts by weight of 37% formalin solution to give an adhesive having a pot life of 25–30 minutes at 73° F.

EXAMPLE III 1,320 parts of resorcinol (12 moles) and 236 parts (2.91 moles) of 37% aqueous formaldehyde were charged to a glass reaction flask, equipped with stirrer, condenser, thermometer, graduated addition funnel and sampling device. The mixture was heated to reflux and 8 parts of oxalic acid was added. Reflux was maintained for one hour during which time the viscosity increased from about 60 cps. to 940 cps. The pH at this point was below scale on the meter, i.e. 0.0. A second portion of formaldehyde solution (372 parts or 4.59 moles) was added and the mixture was refluxed for five minutes. The viscosity rose during this time, even at the increased dilution, to 3100 cps. The pH at this point was indicated as 0.07 on the pH meter.

The batch was diluted with 1000 parts of water, heated again to reflux, charged with a third portion of 37% formaldehyde (208 parts or 2.57 moles), and then refluxed an additional hour. At this point, the viscosity was so high that it could not be measured at room temperature. The batch was then adjusted with 50% aqueous NaOH to a pH of 7.0, and diluted to a final viscosity of 420 cps. The solids content of the adjusted resin solution was 30.3%. The product remained absolutely clear on storage for 14 months and showed no other signs of instability, such as viscosity rise or separation.

The preparation and testing of an adhesive mix from this resin solution, using 15 parts per hundred of a blend of 55% by weight paraformaldehyde and 45% walnut shell flour gave the following data:

Compression shear test (ASTM D–905)—Douglas fir—1065 p.s.i. 95% wood failure, indicating a gluing strength comparable to the wood itself.

Vacuum-pressure delamination test (MIL-A-397B)—1.0%. A delamination of 8% is considered to be waterproof according to the foregoing specification.

The adhesive composition described hereabove was reformulated with various solvents using the resin of this example to give the following results:

Table I
REFORMULATION OF RESIN SOLUTION WITH SOLVENTS

| Solvent composition | pH | Mix viscosity (Brookfield), cps. at 73° F. | Pot life, min. at 73° F. |
|---|---|---|---|
| All water | 7.0 | 13,800 | 105 |
| Solox ¹-water, 50:50 | 6.8 | 8,700 | 170 |
| Solox-water, 75:25 | 6.8 | 10,400 | 195 |
| Solox-water, 25:75 | 6.8 | 10,400 | 155 |
| All Solox | 6.8 | 7,200 | 215 |
| All glycol | 6.7 | 5,800 | 325 |
| Glycol-water, 50:50 | 6.7 | 11,200 | 210 |
| Glycol-water, 75:25 | 6.7 | 8,200 | 260 |
| Glycol-water, 25:75 | 6.8 | 14,200 | 160 |
| Glycol-Solox, 50:50 | 6.8 | 12,000 | 235 |

¹ Solox is denatured ethyl alcohol.

EXAMPLE IV

A resin solution having a solids content of 34.6% was prepared according to the teachings of Rhodes, U.S. 2,385,374 and an adhesive was made therefrom as follows:

330 parts of resorcinol (3 moles) and 60.75 parts of 37% formaldehyde (0.75 mole) were charged to a glass reaction flask equipped with stirrer, condenser, thermometer, graduated addition funnel, and sampling device. The reactor was set in a hot circulating oil bath at 110° C. and heated to reflux in ten minutes.

A second portion of 37% formaldehyde, 145.8 parts (1.8 moles), was added as rapidly as the boil-up would allow. Fifteen minutes time was required; the temperature dropped from 120° C. to 100° C. due to the change in aqueous composition, but reflux was maintained throughout.

Oxalic acid catalyst (2 parts dissolved in 10 parts of water) was then added immediately, and thereafter 250 parts of dilution water were added. The pH was measured and found to be 1.40. The viscosity of the mixture at this point was about 95,000 cps. at 73° F.

The reaction mixture was then adjusted to a pH of 6.95 with 50% aqueous caustic soda solution, and diluted to a viscosity of 400 cps. at 73° F. Determination of nonvolatile solids gave a value of 30.46%. The product was only slightly cloudy on completion of the final pH adjustment, but within one week a considerable separation of resin solids was noted. The preparation and testing of an adhesive mix from this resin solution using 15 parts per hundred of a blend of 55% by weight paraformaldehyde and 45% walnut shell flour gave the following data:

Pot life of mix—110 minutes (at 23° C.).
Age of mix—45 minutes.
Open assembly time—0 minutes.
Closed assembly time—15 minutes.
Compression shear test—Douglas fir—1,055 p.s.i.—65% wood failure, indicating a bonding of considerably less strength than that of Example III.
Vacuum-pressure delamination test (AITC method)—75%, indicating that the bonding was not waterproof.

EXAMPLE V

A resin solution was prepared according to the teachings of Norton, U.S. 2,385,370 and then adjusted with aqueous alkali and diluted to a solids content of 33.97% according to the teachings of Rhodes, U.S. 2,385,374 as follows:

330 parts of resorcinol (3 moles), 250 gm. of water, and 2.0 parts of oxalic acid were charged to a glass reaction flask, equipped as in the two previous examples. The mixture was heated to reflux and 60.75 parts of 37% formaldehyde (0.75 mole) was added at such a rate as to avoid excessive boil-up. The addition required 5 minutes time, and the final temperature was 102° C.

A second portion of 85.05 parts of 37% formaldehyde (1.05 moles) was then added, and while still maintaining reflux conditions, the third and final portion of 60.75 parts (0.75 mole) was added. A total time of 36 minutes was required and the final temperature was 98° C. The pH after the second addition of formaldehyde was 1.25; and after the third addition, it was 1.35.

The reaction mixture was then adjusted to a pH of 6.90 with 50% NaOH, and diluted to a viscosity of 400 c.p.s. at 73° F. with additional water. Final solids content by determination was 33.97%. The product clouded overnight and during the following week it showed considerable resin precipitation. The preparation and testing of an adhesive mix from this resin solution, using 15 parts per hundred of a blend of 55% by weight paraformaldehyde and 45% walnut shell flour gave the following data:

Pot life of mix—110 minutes (at 23° C.).
Age of mix—45 minutes.
Open assembly time—0 minutes.
Closed assembly time—15 minutes.
Compression shear test—885 p.s.i.—100% wood failure, indicating excellent strength.
Vacuum-pressure delamination test—35.33%, indicating that the adhesive was not waterproof.

EXAMPLE VI

Resorcinol, 660 parts, was charged to the reactor according to the method of Example I. There was immediately added 118 parts of formaldehyde and 4 parts of oxalic acid dihydrate. Heat was applied and agitation begun. Thereafter, the method of Example I was followed exactly, with the exception that 186 parts of 37% formaldehyde was used in the second addition and 99 parts in the third addition. After the third addition, the mole ratio of resorcinol to formaldehyde was 1 mole of resorcinol to 0.84 mole of formaldehyde. The mixture was then diluted with 500 parts of water and the pH was adjusted with 25 parts of 50% aqueous caustic to give a clear stable resin solution having a pH in the range of 6.5–7.0.

It is thus seen that the method of Example I can be varied to the extent that the oxalic acid catalyst can be added initially along with the first increment of formaldehyde, rather than subsequent to the first formaldehyde addition.

EXAMPLE VII

The procedure of Example VI was repeated to give a clear stable resin solution having a mole ratio of 1 mole of resorcinol to 0.85 mole of formaldehyde. The product, when discharged, had a viscosity of 8000 c.p.s. and a pH of 6.7. 74 parts water was added to reduce the viscosity to 310 c.p.s. at a resin solids content of 32% by weight.

EXAMPLE VIII

The procedure of Example I was repeated to give a clear stable resin solution having a mole ratio of 1 mole of resorcinol to 0.85 mole formaldehyde. The solution had a viscosity of 4300 c.p.s. at 73° F. and a solids content of 32%. 100 parts water was added to give a stable solution having a viscosity of 300 c.p.s. at 73° F. and a solids content of 29%. The pH of this solution was 7.0.

EXAMPLE IX

The procedure of Example VIII was followed, but additional formaldehyde was reacted with the resin to give a fusible resin having a resorcinol to formaldehyde mole ratio of one mole of resorcinol to 0.9 mole of formaldehyde. When this resin solution was diluted with 300 parts water, there resulted a clear stable solution having a viscosity of 250 c.p.s. at 73° F. and a resin solids contents of 20% by weight.

EXAMPLE X

The resins of Examples VII and VIII were used to formulate adhesive mixes in the manner described in Example II. The exact formulation of the adhesives and the evaluation of their properties are shown in Table II.

Table II
FORMULATION AND EVALUATION OF NOVEL ADHESIVES

| Example No. | VII | VIII |
|---|---|---|
| Resin solids content, percent by weight | 32 | 29 |
| pH | 6.7 | 7.0 |
| Viscosity of resin solution, 73° F. | 310 | 300 |
| Stability at 110° F.: Change in Viscosity, c.p.s. | 310–270 | 310–320 |
| At 110° F.: Period of time, days | 27 | 27 |
| Hardener type, amount p.p.h.r.[1] | Paraform 8 | Paraform 8 |
| Modifier-extender, amount p.p.h.r. | Urea, 7 / Walnut flour, 7 | Urea, 7 / Walnut flour, 7 |
| Mix viscosity at 30 min., poises | 23.8 | 10.2 |
| Pot life, min. at 73° F. | 215 | 200 |
| Maple-cured 8 hrs. at 140–147° F., p.s.i.-W.F.[2] | 2,135–50 | 2,415–40 |
| Oak-cured 8 hrs. at 140–147° F., p.s.i.-W.F.[2] | 2,215–65 | 2,080–85 |
| Fir-cured 144 hrs. at room temperature, p.s.i.-W.F.[2] | 900–90 | 1,080–90 |
| Birch-cured 144 hrs. at room temperature dry, p.s.i.-W.F.[3] | 465–50 | 490–65 |
| 4-hr. boil, p.s.i.-W.F.[4] | 375–85 | 420–85 |

[1] p.p.h.r.—parts per hundred parts resin solution.
[2] p.s.i.-W.F.—Block shear compression strength ASTM D–905; W.F.—Wood failure. This test takes into account the variability of the wood, since in an average of 25 tests as these values are reported, the wood will often break at low strengths, thus indicating the glued joint is stronger than the wood.
[3] Tensile Shear on 3 ply crossbanded 1/16" Birch plywood.
[4] These figures indicate the waterproof quality of the bond. Even after boiling 4 hrs. in water and testing wet, the wood breaks in preference to the glued joint. See Specification CS–35–56 for hardwood plywood.

EXAMPLE XI 200 parts of the resin solution of Example I having a solids content of about 30% was mixed with 80 parts walnut shell flour, 10 parts 50% caustic, 16.5 parts paraformaldehyde and 141 parts water to give an adhesive containing 13.7% by weight resin solids and having a viscosity of 1400 c.p.s. at 73° F. The adhesive had a pot life of 83 minutes. 60 pounds of the adhesive was spread on a double glue line of 1000 sq. feet of plywood (2000 sq. feet of glue line). The gluing was cured for 5 minutes at a temperature of 250° F. in a hot press. A specimen subjected to the 4 hour boil test (CS 45–55) showed a wood failure of 81%. According to the test, the specimen is acceptable if it shows a wood failure of over 60%.

This example illustrates the remarkable flexibility of the resin solutions of the invention. The adhesive prepared as described hereabove had a resin solids content of only 13.7%, in contrast with the commercially available phenol-containing adhesives which have a resin solids content of 25–27%. The commercial adhesives require a curing time of 7.5–7 minutes at a temperature of 280–300° F., whereas it is seen that the 5 minutes cure at 250° F. in a hot press is sufficient using the adhesives of the invention. The resin solids content of the above described novel adhesive can be conveniently varied between 13–20% by weight by varying the amount of water of dilution and extender added to give excellent low resin solids, fast curing adhesives.

We claim:
1. A method of making a storage stable resorcinol-formaldehyde resin solution of infinite dilutability comprising reacting under reflux conditions resorcinol and formaldehyde at a mole ratio of resorcinol to formaldehyde of approximately 1:0.2–0.3 in the presence of sufficient oxalic acid catalyst to lower the pH to less than 1, adding additional formaldehyde to bring the resorcinol to formaldehyde mole ratio to approximately 1:0.5–0.7, heating the resulting mass to reflux, adding thereto water of dilution in an amount of at least 0.5 part by weight per part of resorcinol to control the exothermic reaction occasioned by the formaldehyde addition, adding additional formaldehyde to bring the mole ratio of resorcinol to formaldehyde to approximately 1:0.8–0.9 and the pH of the reaction mixture to 1.3–1.7, heating the mass under reflux for a short period of time and adding thereto sufficient concentrated aqueous caustic to bring the pH within the range of 6.5–7.0.

2. A method of making a storage stable resorcinol-formaldehyde resin solution of infinite dilutability comprising adding to resorcinol sufficient formaldehyde to provide a mole ratio of resorcinol to formaldehyde of approximately 1:0.2–0.3, heating the mass, under agitation, to the reflux temperature, adding thereto sufficient oxalic acid to lower the pH to approximately 0, adding additional formaldehyde to bring the resorcinol to formaldehyde mole ratio to approximately 1:0.5–0.7, heating the resulting mass to reflux, adding thereto water of dilution in an amount of at least 0.5 part by weight per part of resorcinol to control the exothermic reaction occasioned by the formaldehyde addition, adding additional formaldehyde to bring the mole ratio of resorcinol to formaldehyde to approximately 1:0.8–0.9 and the pH of the reaction mixture to 1.3–1.7, heating the mass under reflux for a short period of time and adding thereto sufficient concentrated aqueous caustic to bring the pH within the range of 6.5–7.0.

3. A method of making an adhesive comprising admixing a solution of a water soluble, fusible resorcinol-formaldehyde resin of infinite dilutability prepared by the steps comprising reacting under reflux conditions resorcinol and formaldehyde at a mole ratio of resorcinol to formaldehyde of approximately 1:0.2–0.3 in the presence of sufficient oxalic acid catalyst to lower the pH to less than 1, adding additional formaldehyde to bring the resorcinol to formaldehyde mole ratio to approximately 1:0.5–0.7, heating the resulting mass to reflux, adding thereto water of dilution in an amount of at least 0.5 part by weight per part of resorcinol to control the exothermic reaction occasioned by the formaldehyde addition, adding additional formaldehyde to bring the mole ratio of resorcinol to formaldehyde to approximately 1:0.8–0.9 and the pH of the reaction mixture to 1.3–1.7, heating the mass under reflux for a short period of time and adding thereto sufficient concentrated aqueous caustic to bring the pH within the range of 6.5–7.0, with a methylene donor in an amount sufficient to convert said water soluble, fusible resin into a cross-linked insoluble, infusible resin, the viscosity of the resulting mix being between 300–2500 cps. at 73° F.

4. A method of making an adhesive comprising admixing a solution of a water soluble, fusible resorcinol-formaldehyde resin of infinite dilutability prepared by the steps comprising adding to resorcinol sufficient formaldehyde to provide a mole ratio of resorcinol to formaldehyde of approximately 1:0.2–0.3, heating the mass, under agitation, to the reflux temperature, adding thereto sufficient oxalic acid to lower the pH to approximately 0, adding additional formaldehyde to bring the resorcinol to formaldehyde mole ratio to approximately 1:0.5–0.7, heating the resulting mass to reflux, adding thereto water of dilution in an amount of at least 0.5 part by weight per part of resorcinol to control the exothermic reaction occasioned by the formaldehyde addition, adding additional formaldehyde to bring the mole ratio of resorcinol to formaldehyde to approximately 1:0.8–0.9 and the pH of the reaction mixture to 1.3–1.7, heating the mass under reflux for a short period of time and adding thereto sufficient concentrated aqueous caustic to bring the pH within the range of 6.5–7.0, with a methylene donor in an amount sufficient to convert said water soluble, fusible resin into a cross-linked insoluble, infusible resin, the viscosity of the resulting mix being between 300–2500 cps. at 73° F.

5. Method according to claim 4 wherein the methylene donor is paraformaldehyde.

6. Method according to claim 4, wherein the adhesive contains a filler.

7. Method according to claim 4, wherein the adhesive is modified with aqueous caustic.

8. Method according to claim 4, wherein the adhesive contains urea as a modifier.

References Cited in the file of this patent

UNITED STATES PATENTS

| | | |
|---|---|---|
| 2,385,370 | Norton | Sept. 25, 1945 |
| 2,488,495 | Malashevitz | Nov. 15, 1949 |
| 2,490,927 | Spahr et al. | Dec. 13, 1949 |
| 2,494,537 | Babcock et al. | Jan. 17, 1950 |
| 2,502,511 | Davies et al. | Apr. 4, 1950 |
| 2,589,286 | Rhodes | Mar. 8, 1952 |